July 10, 1951  
C. I. YOUNG  
2,560,059  
MILKING TRUCK

Filed July 15, 1946  
2 Sheets-Sheet 1

INVENTOR  
C. I. YOUNG,  
BY  
Barry & Cyr  
ATTORNEYS

July 10, 1951 — C. I. YOUNG — 2,560,059
MILKING TRUCK
Filed July 15, 1946 — 2 Sheets-Sheet 2
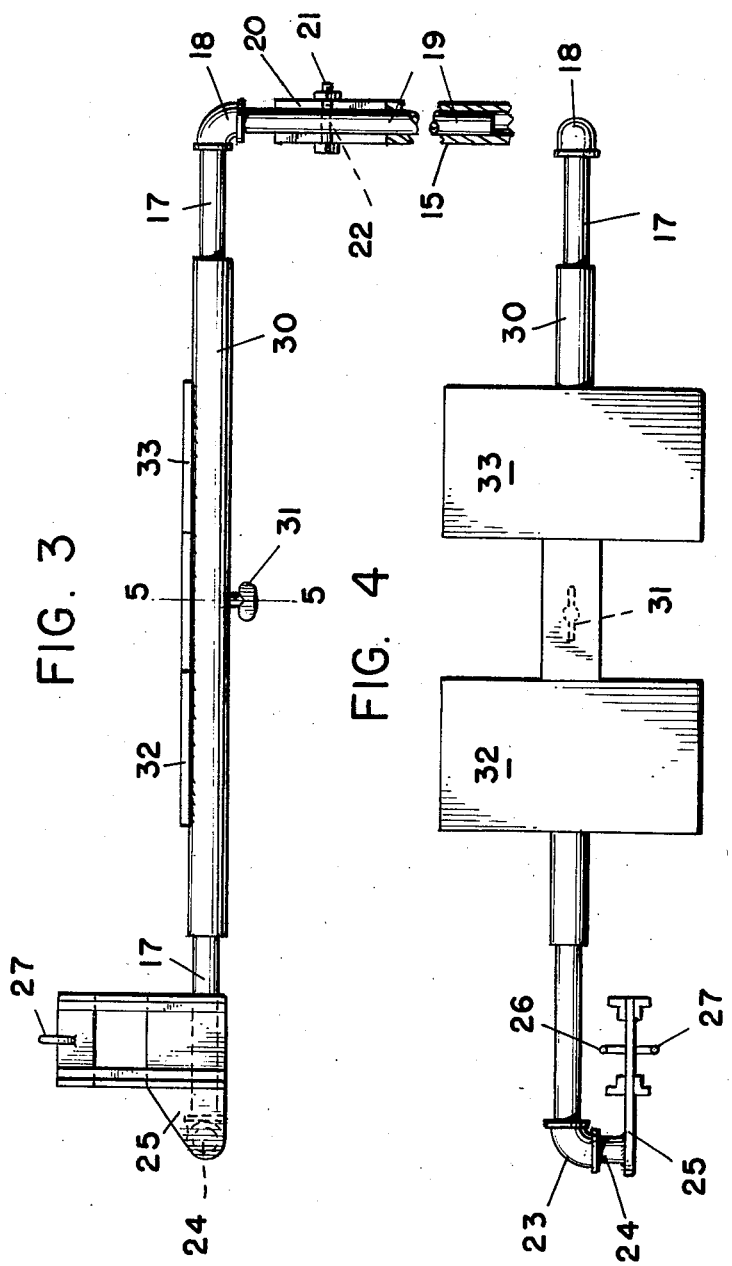
INVENTOR
C. I. YOUNG,
BY
Barry & Cyr
ATTORNEYS

UNITED STATES PATENT OFFICE 2,560,059

MILKING TRUCK

Carroll I. Young, Westminster, Md.

Application July 15, 1946, Serial No. 683,720

2 Claims. (Cl. 296—3)

This invention relates to wheeled vehicles, and more particularly to a push or pull truck for use in dairies.

One of the objects of the invention is to provide a truck having a platform to support milk pails, milking machine units, pails for sterilizing solutions, towels, and other dairy appliances while being transported from dairy to barn, stall to stall and to the point of treatment of the milk to be sent out to consumers.

Another object of the invention is to supply a milk truck having overhanging means for the support of a conventional scale which may be used by an operator at either side of the truck in weighing the milk obtained from the different cows in the herd.

A still further object is to supply a truck of the above character provided with convenient means for supporting a record book containing the names of the cows in the herd so that an operator, while weighing the milk from any cow, may make a notation on the record book of the weight of the milk given by the cow.

A still further object is the provision of a milk truck having a record book support adapted to be tilted toward either side of the truck and to be fixedly secured in tilted position so as to make it convenient for an operator to make notes in the book while standing at either side of the truck.

Another object is to provide a truck of this character having an elevated shelf at one end thereof for the support of pails containing clean or soiled towels.

With the foregoing objects outlined with other objects in view which will appear as the description proceeds, the invention consists in the novel features hereinafter described in detail, illustrated in the accompanying drawings, and more particularly pointed out in the appended claims:

In the drawings:

Fig. 3 is a side elevation, partly in vertical section, of the scale and book supporting means.

Fig. 4 is a top plan view of the structure shown in Fig. 3.

Fig. 5 is a vertical sectional view of a detail taken on the line 5—5 of Fig. 3.

Figure 1:
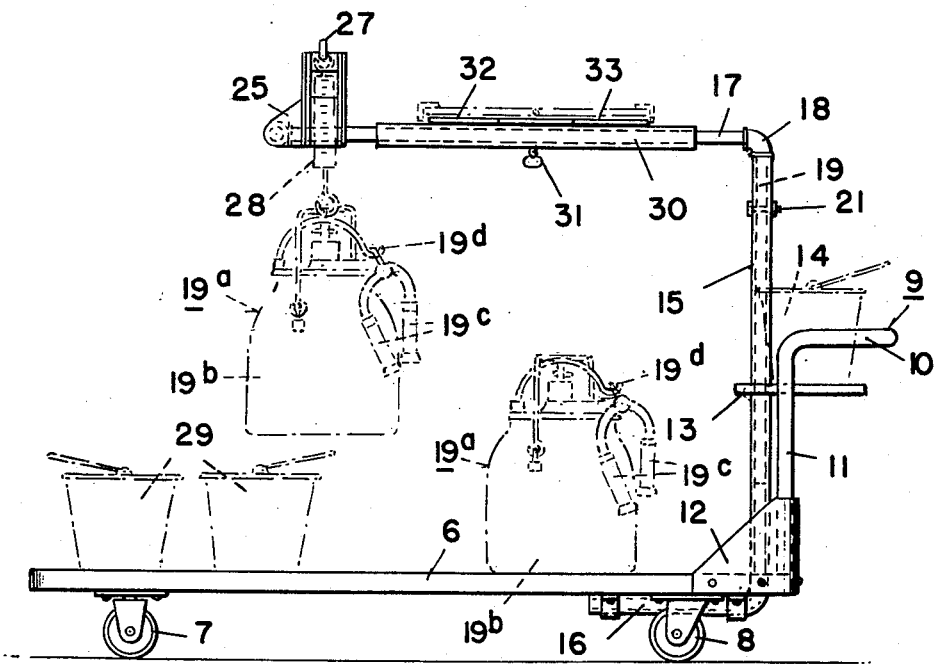
Fig. 1 is a side elevation of a milking truck in accordance with the invention and showing in dotted lines, several pails supported thereby and one unit suspended from a scale.

Referring to the drawings, 6 designates a horizontal platform mounted on caster wheels 7 and 8, which are pivoted on vertical axes for swivelling and guiding purposes.

A handle 9, preferably including a recumbent U-shaped portion 10, has vertical legs 11 secured to the rear corners of the truck and such legs may be reinforced by metal gussets 12 firmly secured to the platform and legs.

A shelf 13 is supported by the legs near the upper end portion of the handle and may be used to support pails 14 containing used or soiled towels.

A hollow metallic post 15 has its base 16 firmly secured to the central portion of the platform, and preferably extends up through the shelf 13 so that it can also be employed to support the latter.

An arm 17, which may consist of a rigid metal pipe, is connected by an elbow 18 to a depending leg 19, and the latter as best shown in Fig. 3, may be inserted into the upper end of the post and may be adjustably secured in position by any suitable means, so the arm may be raised or lowered to accommodate operators of various heights and milking machine units 19a of various makes. For adjustment purposes, the upper end of the post may be provided with diametrically opposite slots for the reception of a bolt 21 that extends through a horizontal hole 22 in the leg 19.

Figure 2:
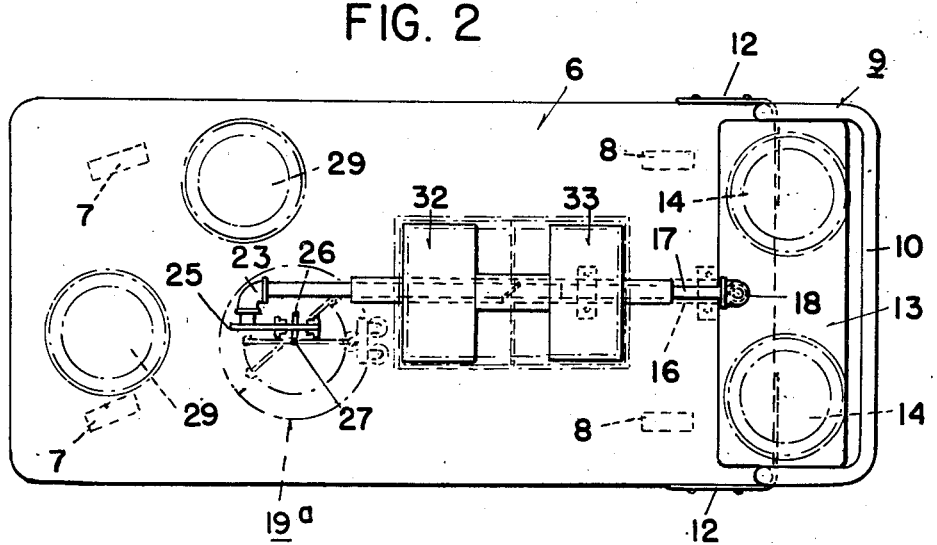
Fig. 2 is a top plan view of the same.

As may be seen from Figs. 1 and 2, the arm extends from the post and overhangs the platform, and the free end of the arm may be provided with a fixedly connected elbow 23, rigidly supporting a stud 24, fixed to a bracket 25. The latter is provided at its opposite sides with hooks 26 and 27 for the support of a conventional scale 28, employed in weighing milk contained in pail 19b of milking machine units 19a. As the hooks are arranged at opposite sides of the bracket, it is evident that the scale may be used by a dairyman standing at either side of the truck.

A sleeve or pipe 30 is rotatably mounted on the arm 17 and is adjustably secured thereto by any suitable means, such as a thumb screw 31. The sleeve is fixed to a pair of plates 32 and 33, each of which extends in opposite directions from the sleeve. Due to this construction, if a record book having a pocket in its cover to receive the projecting portion of either of the plates 32 and 33, is used in connection with the device, one cover of the book may rest upon plate 32 while the other cover rests on the plate 33, as will be clear from Fig. 2. When the book is so supported, a dairyman may make notations therein to indicate the weight of the milk given by any cow in the herd. It is obvious that if the thumb screw 31 is loosened and the book support is tilted toward either side of the truck, the operator may readily make notations in the book opposite the names of the cows contained therein.

In the use of the truck, the milking units 19a are assembled and the sterilizing solution and towel solution are prepared in the dairy. The assembled units are placed on platform 6, towel solution in pails 14, and sterilizing solution in pails 29 on the platform. Then the truck and its load is moved to the barn.

An operator removes a clean towel from one pail 14, washes cow, and returns soiled towel to the other pail 14. He then removes inflations 19c from hook 19d on a milker unit, immerses them in the solution in one of the pails 29, returns the inflations to the hook on the milking unit, carries the unit to a cow, and places the inflations on the cow. After a few minutes, milking is completed, the inflations are removed from the cow, hung on the hook of the unit, the unit is placed on platform 6, inflations removed from hook on unit, immersed in the solution in one of the pails 29. The unit and milk content is hung on the scale 28, the weight recorded in the book on the book support, and the unit removed from the scale and applied to next cow and so on.

From the foregoing, it is believed the construction and advantages of the truck may be readily understood by those familiar with dairying, and it is evident that changes may be made in the details disclosed without departing from the spirit of the invention, as expressed in the following claims:

What I claim and desire to secure by Letters Patent is:

1. A milking truck comprising, a horizontal platform devoid of any superstructure along opposite sides and one end thereof, wheels supporting said platform, a handle including two rigid spaced legs extending upwardly from the other end of the platform at the corners thereof and fixedly secured thereto, a shelf supported by said legs and projecting therefrom beyond the associated end of the platform, a post rigidly secured to the platform and arranged substantially equi-distant from said legs, said post being connected to the shelf, said post extending a substantial distance above the handle and said shelf, an elongated rigid arm extending from the post in a direction opposite to the shelf and overhanging the platform, said post constituting the sole support for said arm and maintaining the arm at a fixed height above the platform so as to support spring scales and a record sheet holding device thereon whereby milk containers may be weighed while depending from said scales and entries may be made on the record sheets.

2. In a truck for use in a dairy, a horizontal rectangular shaped platform devoid of any superstructure along opposite sides and one end thereof, wheels supporting said platform for rolling movement, a U-shaped handle having arms arranged in a substantially horizontal position, a leg extending vertically upward from a corner at the second end of the platform and joining one arm of the U-shaped handle, a leg extending vertically upward from the other corner at the second end of the platform joining the other arm of the U-shaped handle, means rigidly securing said legs to said platform, a shelf supported by said legs projecting therefrom beyond the second end of the platform below the handle, a post rigidly secured to the platform extending upwardly therefrom between said legs and connected to said shelf, said post extending a substantial distance above said handle and said shelf, a rigid arm extending from the post in a direction opposite to the shelf and overhanging the platform, said post constituting the sole support for said arm and maintaining the arm at a fixed height above said platform so as to provide support for spring scales and a record sheet holding device thereon whereby milk containers may be weighed while depending from said scales and entries may be made on the record sheets.

CARROLL I. YOUNG.

REFERENCES CITED

The following references are of record in the file of this patent:

UNITED STATES PATENTS

| Number | Name | Date |
|---|---|---|
| 234,001 | Dickey | Nov. 2, 1880 |
| 533,410 | Blake | Jan. 29, 1895 |
| 804,832 | Davis | Nov. 21, 1905 |
| 1,512,291 | McGuire | Oct. 21, 1924 |
| 1,633,761 | Byrns | June 28, 1927 |
| 1,706,690 | Boyuls | Mar. 26, 1929 |
| 2,218,510 | Albertson et al. | Oct. 22, 1940 |
| 2,319,589 | Drinkwater | May 18, 1943 |
| 2,361,970 | Schmitt | Nov. 7, 1944 |

FOREIGN PATENTS

| Number | Country | Date |
|---|---|---|
| 306,720 | Great Britain | Feb. 28, 1929 |